United States Patent
Betin et al.

(10) Patent No.: US 6,346,686 B1
(45) Date of Patent: Feb. 12, 2002

(54) APPARATUS AND METHOD FOR ENHANCED LASER MACHINING BY OPTIMIZATION OF PULSE DURATION AND SPACING

(75) Inventors: Alexander A. Betin; Hans W. Bruesselbach, both of Calabasas; Metin S. Mangir, Santa Monica, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/421,032

(22) Filed: Oct. 20, 1999

Related U.S. Application Data

(60) Provisional application No. 60/129,255, filed on Apr. 14, 1999.

(51) Int. Cl.[7] ............................................. B23K 26/38
(52) U.S. Cl. ............................ 219/121.61; 219/121.7
(58) Field of Search ...................... 219/121.6, 121.67, 219/121.7, 121.71, 121.75, 121.61; 372/18

(56) References Cited

U.S. PATENT DOCUMENTS

| | | | | |
|---|---|---|---|---|
| 3,869,680 A | * | 3/1975 | Fletcher et al. | 331/94.5 M |
| 4,025,875 A | * | 5/1977 | Fletcher et al. | 331/94.5 S |
| 5,151,909 A | * | 9/1992 | Davenport et al. | 372/22 |
| 5,341,236 A | * | 8/1994 | Stappaerts | 359/328 |
| 5,726,795 A | | 3/1998 | Betin et al. | |
| 5,729,380 A | | 3/1998 | Betin et al. | |

OTHER PUBLICATIONS

Rockwell, D. "A Review of Phase–Conjugate Solid–State Lasers" (1988) IEEE, Journal of Quantum Electronics, vol. 24, No. 6, pp. 1124–1140.

Betin, A.A., et al. "Generation of radiation by four–wave interaction in a feed–back system in the λ=10 μ range" (1987) Sov. J. Quantum Electronics, vol. 17, pp. 636–640.

Dement'ev, A.S., et al. "Emission from a YAG:Nd laser with a four–wave thermal mirror in a rng resonator" (1988) American Institute of Physics, pp. 631–633.

Betin, A.A., et al. "Spatial Structure of radiation from a neodymium–glass four–wave feedback" (1992) Sov. J. Quantum Electron., American Institute of Physics, pp. 715–717.

Betin, A.A., et al. "Selection of a phase–conjugate wave in an oscillator based on a four–wave interaction with feedback in an extended nonlinear medium" (1994) Quantum Electronics, pp. 219–222.

(List continued on next page.)

*Primary Examiner*—Samuel M. Heinrich
(74) *Attorney, Agent, or Firm*—V. D. Duraiswamy; M. W. Sales

(57) ABSTRACT

A laser comprising a master oscillator and a loop phase conjugate mirror (Loop-PCM) for substantially eliminating transient relaxation oscillations to instead form controlled sustained pulsations. In a preferred embodiment suitable for material processing applications with high power requirements, the master oscillator is part of a Phase Conjugate Master Oscillator Power Amplifier (PC-MOPA). A method for processing a material using a Loop-PCM by determining and using an optimal pulse fluence, duration and spacing is provided. Using pulses of the kind which are produced by the transient, and normally not desirable, relaxation oscillations common to Nd:YAG and other lasers, relaxation oscillations with controllable pulse duration, repetition rate and duty cycle are generated, making it ideal for materials processing.

17 Claims, 10 Drawing Sheets

OTHER PUBLICATIONS

Ergakov, K.V., et al. "Energy optimisation of an Nd:YAG–based four–wave–mixing oscillator with feedback and investigation of its adaptive properties in the pulse–periodic regime" (1996) Quantum Electronics, pp. 389–394.

Betin, A.A. "Phase Conjugation Based on Thermal Nonlinearity" Optical Physics Laboratory, Hughes Research Labratories, pp. 1–3.

Green, R.P.M. et al., "Holographic laser resonators in Nd:YAG" (1994) Optical Society of America, Optics Letters, vol. 19, No. 6, pp. 393–395.

Berdyshev, A.V., et al., "Formation of amplitude gratings in the medium of a CO laser subject to the field of its own multifrequency radiation" (1994) Quantum Electronics, pp. 87–92.

Ageichik, A.A., et al. "Self–phase conjugation of middle infrared radiation by four–wave mixing in active medium of $Co_2$–laser with feedback loop" (1996) SPIE, vol. 221, pp. 119–125.

* cited by examiner

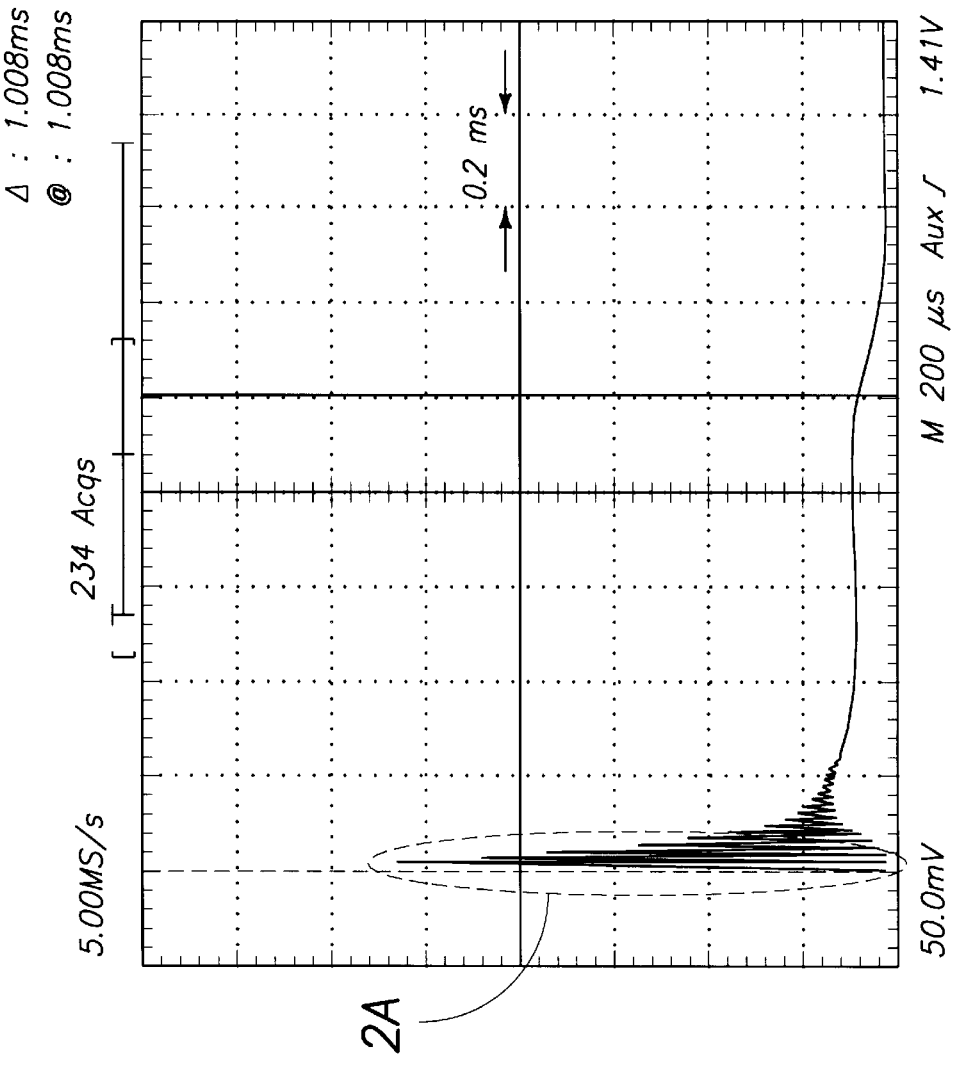
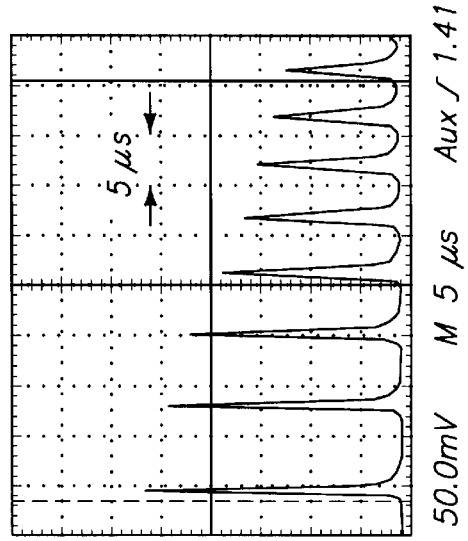
FIG. 2B
FIG. 2A

APPARATUS AND METHOD FOR ENHANCED LASER MACHINING BY OPTIMIZATION OF PULSE DURATION AND SPACING

CROSS-REFERENCE TO RELATED APPLICATIONS

This application claims benefit of U.S. Provisional Application Serial No. 60/129,255, filed Apr. 14, 1999, by Alexander A. Betin, Hans W. Bruesselbach and Metin S. Mangir, and entitled "Apparatus and Method For Processing Material Using A Laser," which application is hereby incorporated by reference herein.

STATEMENT OF RIGHTS OWNED

This invention was made with Government support under Contract Number MDA972-94-3-0020 awarded by the Advanced Research Projects Agency (ARPA). The Government has certain rights in this invention.

BACKGROUND OF THE INVENTION

1. Field of the Invention

The present invention generally relates to an apparatus and method for processing material using lasers and more particularly to removal of material using lasers and more particularly to removal of material using a laser with optimally configured pulses.

2. Description of the Related Art

Lasers and laser systems for drilling materials are commercially available. Many of these lasers typically cause excessive heating of the material on which they are incident and this may not be desirable for certain types of material processing. Other commercially available lasers typically produce Q-switched or mode-locked pulses and it is difficult to control the duration, shape and spacing of the pulses generated by such lasers.

In principle, it is possible to control the pulse shape by using an active modulator in the laser resonator, an approach used, for example in the DP-11 laser available from TRW Inc. The DP-11 laser can produce a series of short (~100 ns), spaced (>20 $\mu$sec) pulses under the ~400 $\mu$s long diode pump pulse envelope.

However, the use of a modulator in such an actively controlled system results in certain drawbacks such as increase in the cost and complexity of the system and power and efficiency limitations. Specifically, the DP-11 laser generates 350–500 W average power when unmodulated (400 Hz repetition rate quasi-CW operation with 400–500 $\mu$s long pulses), whereas the output power is limited to ~80 W with the modulated pulse format. Further, such a modulator is not usable at high power since the active modulator device probably cannot be scaled. The DP-23 laser, also available from TRW Inc., is more powerful (nominally 2–3 kW average with 400 $\mu$s long pulses), but does not use such modulation.

Electro-Discharge Machining (EDM) is also presently used for drilling small holes. However, duration times on the order of tens of seconds or longer are required for each hole and diameters smaller than ~0.006" and depth to diameter ratios greater than ~50 are very difficult to achieve.

Phase conjugate master oscillator power amplifier laser architectures (PC-MOPA) capable of achieving high average output power with near diffraction-limited beam quality are known. See, for example, the article "A Review of Phase-Conjugate Solid-State Lasers" by David A. Rockwell, IEEE Journal of Quantum Electronics, vol. 24, no. 6, June 1988, pp. 1124–1140, the content of which is hereby incorporated herein by reference.

Loop phase conjugate mirrors (Loop PCMs) are also known. See, for example U.S. Pat. No. 5,729,380 entitled "Loop Phase-Conjugate Mirror For Depolarized Beams", inventors: Alexander A. Betin and Metin S. Mangir, issued Mar. 17, 1998 to Hughes Electronics Corporation, the assignee of the present invention. Also see U.S. Pat. No. 5,726,795, entitled "Compact Phase-Conjugate Mirror Utilizing Four-Wave Mixing In a Loop Configuration", inventors: Alexander A. Betin, Metin S. Mangir and David A. Rockwell, issued Mar. 10, 1998, and assigned to Hughes Electronics Corporation, the assignee of the present invention. The subject matter of U.S. Pat. Nos. 5,726,795 and 5,729,380 are incorporated herein by this reference.

Additional information regarding loop PCM can be found in A. A. Betin and O. V. Mitropol'sky, "Generation of radiation by four-wave interaction in a feedback system in the $\lambda$=10 $\mu$m range," Sov. J. Quant.Electron. 17, 636 (1987) and the article by A. S. Dement'ev and E. Ya. Murauskas, "Emission from a YAG:Nd laser with a four-wave thermal mirror in a ring resonator," Sov. J. Quant. Electron. 18, 631 (1988), each of which is hereby incorporated by reference herein.)

FIG. 1 is a diagram of a system employing Loop PCM. The input beam E1 100 first passes through a nonlinear medium 102, which can be a simple absorption cell 344. The input beam 100 is then directed through an amplifier 104 having a gain G by two or more mirrors 106, 108 to form a loop or ring. The amplified wave 110, labeled $E_3$, is directed to intersect $E_1$ 100 at a small angle in the cell 102. These propagating waves, having sufficient coherence length, form an interference pattern in the nonlinear medium 102 that produces an associated index grating of modulation dn ~$E_1 E_3^*$. The grating is characterized by a reflectivity R which closes the loop and allows ring laser oscillation under the condition RG>1. Not shown, but used in many cases, is a non-reciprocal optical diode that prevents saturation of the loop amplifier 104 by the incoming input beam 100 and preferentially selects the ring oscillation to be in the opposite direction from the input beam 100. Being the laser oscillation mode, beam $E_2$ 112 starts from spontaneous noise, diffracts from the grating to become beam $E_4$ 114 and is amplified as it passes around the loop and becomes $E_2$ 112 again. The grating and loop resonator select wave $E_2$ 112 to be phase conjugated to the input beam 100. The portion of $E_2$ 112 that is transmitted by the grating is, finally, the output wave $E_{out}$ 116, which is phase conjugate to $E_1$ 100 and may be larger in amplitude.

Any kind of nonlinear mechanism for recording a grating hologram can be used, but most of the work reported in the literature has been done using the thermal nonlinearity in liquids and the gain saturation effect in the active medium of the amplifier itself. References which discuss the use of thermal nonlinearity in liquids include: A. A. Betin and O. V. Mitropol'sky, "Generation of radiation by four-wave interaction in a feedback system in the $\lambda$=10 $\mu$m range," Sov. J. Quant.Electron. 17, 636 (1987); A. S. Dement'ev and E. Ya. Murauskas, "Emission from a YAG:Nd laser with a four-wave thermal mirror in a ring resonator," Sov. J. Quant. Electron. 18, 631 (1988); A. A. Betin and A. V. Kirsanov, "Spatial structure of radiation from a neodymium glass four-wave feedback oscillator," Sov.J.Quant.Electron. 22, 715 (1992); A. A. Betin and A. V. Kirsanov, "Selection of a phase-conjugate wave in an oscillator based on a four-wave interaction with feedback in an extended nonlinear medium," Quantum Electronics 24, 219 (1994); K. V. Ergakov and V. V. Yarovoy, "Energy optimization of an Nd:YAG-based four-wave-mixing oscillator with feedback and investigation of its adaptive properties in the pulse-periodic regime," Quantum Electronics 26, 389 (1996), each of which is hereby incorporated by reference herein. References which use the gain saturation effect in the active medium of the amplifier itself include: A. A. Betin, "Phase conjugation based on thermal nonlinearity," Nonlinear Optics, Maui, Hawaii, July 1996, Techn. Digest v. 11, p.336–339; R.P.M. Green, G. J. Crofts and M. J. Damzen, "Holographic Laser resonators in Nd:YAG, "Optics Letters 19, 393 (1994); A. V. Berdyshev, A. K. Kurnosov, and A. P. Napartovich "Formation of amplitude grating in the medium of a CO laser subject to the field of its own multifrequency radiation," Quantum Electronics 24 87 (1994); A. A. Ageichik, et al. "Self-phase conjugation of middle-infrared radiation by four-wave mixing in active medium of $CO_2$ laser with feedback loop," in Laser Optics '95: Phase Conjugation and Adaptive Optics, Vladimir E. Sherstobitov, Editor, Proc. SPIE 2771, 119–125 (1996), each of which is hereby incorporated by reference herein.

There is a continuing need for laser systems and methods that improve the efficiency of laser materials processing, particularly with respect to material removal such as laser drilling.

SUMMARY OF THE INVENTION

To address the requirements described above, the present invention provides an apparatus for generating radiation comprising a master oscillator and a phase conjugator for controlling transient relaxation oscillations to form sustained pump pulses. In a preferred embodiment, the phase conjugator is a loop phase conjugate mirror (Loop PCM). The present invention uses the oscillatory output of the Loop-PCM for material processing applications by controlling the pulsations and sustaining them, even for pump pulses exceeding 1 ms. Through selection of the pulse duration and spacing in accordance with the teachings herein, the pulses are made suitable for various materials processing applications.

In a preferred embodiment suitable for applications requiring greater amplification, the master oscillator is part of a phase conjugate master oscillator power amplifier (PC-MOPA).

The laser pulses generated by the present laser very effectively and efficiently remove material, providing nearly thousand-fold enhancements in drilling efficiency in some cases while using microsecond time scale laser pulses. The apparatus of the invention is capable of drilling holes using much less laser energy per hole than the related art, and, consequently, much higher hole production rates are possible with a given laser power.

The present invention can substantially reduce the laser power requirements to achieve specific desired material processing results in various laser applications, including medical surgery and military applications. Although the drilling of holes is discussed in some detail herein as an exemplary case, the scope of the present invention is not limited to drilling but is applicable to all types of material processing applications. A method for determining an optimal pulse energy, duration and spacing for any given material is described. Using pulses of the kind that are produced by the transient, and normally not desirable, relaxation oscillations common to neodymium yttrium aluminum garnet (Nd:YAG) and other lasers, the present PC-MOPA-Loop PCM can sustain relaxation oscillations with controllable pulse duration, repetition rate and duty cycle, making it ideal for materials processing.

Key aspects of and advantages achieved by the present invention include laser drilling using microsecond pulse formats at particular repetition rates; a method for selecting an optimal pulse energy, duration, and spacing for any given material; a unique laser architecture that makes it possible to achieve sustained relaxation oscillations, producing suitable pulses; and techniques to control the repetition rate, pulse duration and duty cycle (the repetition rate and pulse duration being interrelated but not independently controllable).

These and other features and advantages of the present invention will be apparent to those skilled in the art from the following detailed description of preferred embodiments, taken together with the accompanying drawings.

BRIEF DESCRIPTION OF THE DRAWINGS

Referring now to the drawings in which like reference numbers represent corresponding parts throughout:

FIG. 2(a) is a graphical representation of a waveform for drilling using pulses from a conventional industrial laser;

FIG. 2(b) is a temporally expanded view of the initial portion of FIG. 2(a);

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

A typical waveform of an industrial Nd:YAG laser is illustrated in FIGS. 2(a) and 2(b). It can be seen that there is relaxation oscillation at the beginning of the pulse decaying in approximately 100 $\mu$sec. With a laser pulse of about 1 msec duration, as shown in FIG. 2(b), typical transient relaxation oscillations occur during the first ~0.1 msec of the pulse. Experiments that have been conducted show that, with these conventional industrial laser pulses, about 1,300 pulses at 300 mJ energy per pulse are required to penetrate a 0.8 mm thick steel sample. Conventional teaching has been that the transient relaxation oscillations that occur when conventional lasers experience pumping transients or other perturbations are undesirable and much effort has been expended to eliminate such behavior in conventional lasers, or to take advantage of it only for achieving a single gain-switched pulse. (See, e.g., Walter Koechner, Solid-State Laser Engineering, Fourth Edition (Springer-Verlag, Berlin 1996) pages 106–109 and 252–255, incorporated herein by reference).

However, as described in greater detail below, new insight into the relationship between pulse fluence and duration and target material characteristics shows that such transient relaxation oscillations can be used to optimally process target materials. The present invention recognizes and exploits this new insight.

In one embodiment, the present invention provides a phase conjugate master oscillator power amplifier (PC-MOPA) laser incorporating a loop phase conjugate mirror (Loop PCM). The Loop-PCM is useful in generating the desired pulse formats of the present invention.

Figure 3:
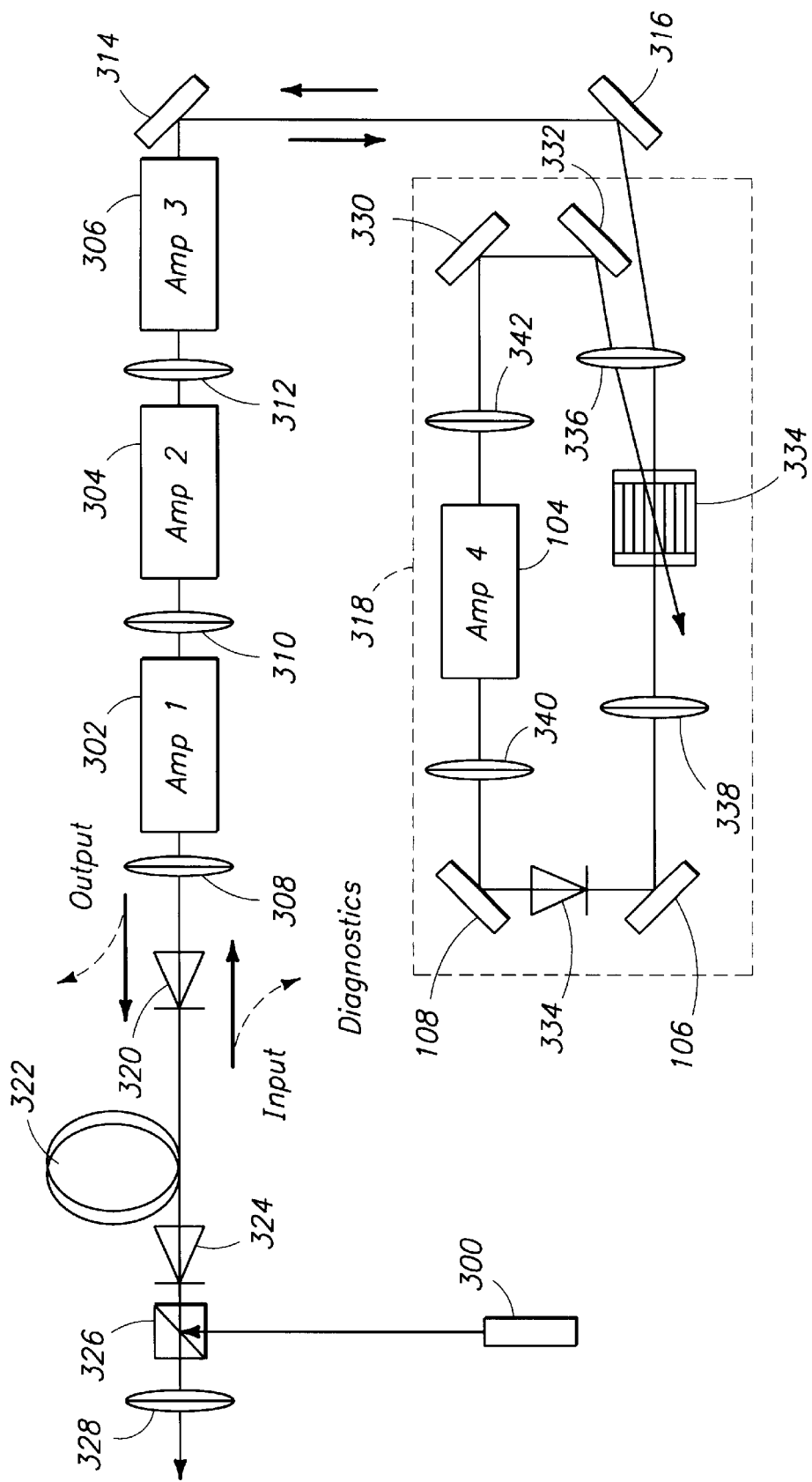
FIG. 3 is a block diagram of a PC-MOPA laser incorporating a loop PCM.

FIG. 3 is a diagram of one embodiment of the PC-MOPA-Loop PCM structure of the present invention. The PC-MOPA portion comprises a master oscillator radiation source 300 such as a diffraction-limited continuous wave oscillator driving at least one laser gain element such as (amplifier—AMP. 1). The PC-MOPA portion can have more than one laser gain element. In FIG. 3, three elements, namely, AMP. 1, AMP. 2 and AMP. 3 are illustrated, each preceded in the optical path by a lens 308, 310, 312.

The master oscillator 300 comprises a high quality coherent radiation source that can be a laser. Input means are provided for coupling radiation from the master oscillator into the gain elements 302, 304, and 306. Mirrors 314, 316 direct amplified radiation from the gain elements 302, 304, 306 to the phase conjugator (Loop PCM, 318) disposed along an optical path beyond the gain elements 302, 304, 306. The phase conjugator 318 returns the phase conjugate of the received radiation. An output coupler, which includes diodes 320 and 324 is disposed between the master oscillator 300 and the laser gain element(s) 302, 304, 306. The output coupler couples amplified radiation out of the laser as a single beam of radiation. In one embodiment, the output coupler comprises a Faraday rotator or other suitable input/output optical coupler.

The output beam of radiation comprises radiation that has been amplified by two traversals of the gain elements 302, 304, 306. However, if the power requirements of the application do not necessitate a high level of amplification, laser gain elements 302, 304 and 306 can be disabled or omitted altogether. Optionally, output lens 328 is used to focus or otherwise modify the output beam as desired.

FIG. 3 also illustrates an optional a fiber optic beam delivery/compensation diagnostics portion, which can be used to monitor or test the system. The fiber optic beam delivery/compensation diagnostics portion comprises a diode 320 receiving the output beam returning through lens 308, followed by a beam delivery fiber 322 (which may be, for example a 0.6–1 mm by 10 m fiber), another diode 324, beam splitter 326 and a final lens 328.

Figure 1:
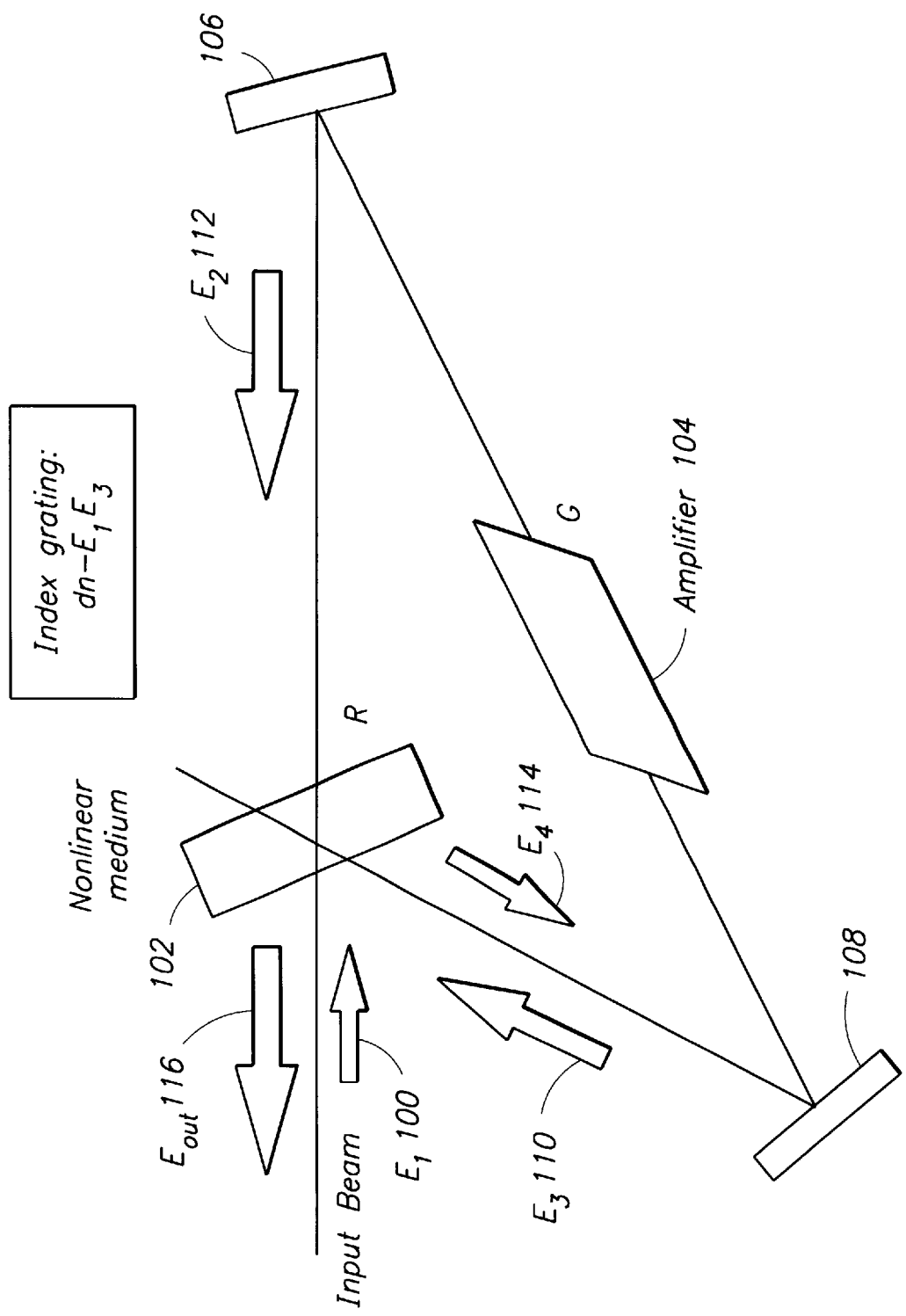
FIG. 1 is a diagram illustrating a Loop PCM.

The preferred phase conjugator of the present invention is a Loop PCM 318. As illustrated in FIG. 3 and FIG. 1, the input beam 100, $E_1$, (after traversing the gain elements 302, 304, 306 of the PC-MOPA) is directed into a nonlinear medium 102. In FIG. 3, this nonlinear medium 102 is illustrated as an absorption cell 344. The input beam 100 passes through a nonlinear medium 102 contained within the cell and is then directed through an optical gain medium such as an amplifier 104 with gain G by relay optics, which may include a combination of mirrors and lenses such as mirrors 106, 108, 330, and 332 and lenses 338, 340, 342, and 336 to form a loop or ring. The relay optics bidirectionally directs the loop beam 110 ($E_3$) back to the nonlinear cell 102 and it intersects and optically interferes with input signal beam 100 ($E_1$) therein to form a refractive index grating in the nonlinear medium 102. The relay optics and reflection from the refractive index grating form an optical loop.

Shown in FIG. 3 (but not shown in FIG. 1) is a non-reciprocal leaky optical diode 334 that prevents saturation of the loop amplifier by the incoming input beam and preferentially biases the ring oscillation to be in the opposite direction from the input beam. Also shown in FIG. 3, but not in FIG. 1, is a series of lenses 336, 338, 340, 342 along the optical path. Beam $E_2$ 112 starts from spontaneous noise in the amplifier 104. It then gets diffracted from the grating in the absorption cell 344 to become $E_4$ 114, which is amplified as it passes around the loop and becomes $E_2$ 112 again. The elements of FIG. 1, that is, the optically nonlinear medium 102, the amplifier 104 and at least two mirrors 106, 108 form a loop resonator (R). The grating and loop resonator select wave $E_2$ 112 to be phase conjugated to the input beam 100. The portion of $E_2$, 112 that is transmitted by the grating as the output wave 116 $E_{out}$, is phase conjugate to $E_1$ 100, but may be much larger in amplitude.

It is desirable that the output of the loop conjugator 318 and, consequently, the output of the MOPA, be oscillatory. The output is somewhat like the transient relaxation oscillations that occur when conventional lasers experience pumping transients or other perturbations. As discussed earlier, in the past, artisans have suppressed or minimized such pumping transients or other perturbations. In contrast to conventional teaching, however, in the present invention, these transient relaxation oscillations are used for material processing applications by controlling the pulsations and sustaining them, even for pump pulses of duration greater than 1 ms.

Furthermore, by careful selection of the pulse duration and spacing, the pulses are made suitable for various materials processing applications. Although the drilling of holes is discussed in some detail herein as an exemplary case, the scope of the present invention is not limited to drilling but is applicable to all types of laser material processing applications. The present invention can substantially reduce the laser power requirements to achieve specific desired material processing results in various applications in which such laser systems are typically used, including medical surgery and military applications.

Figure 4:
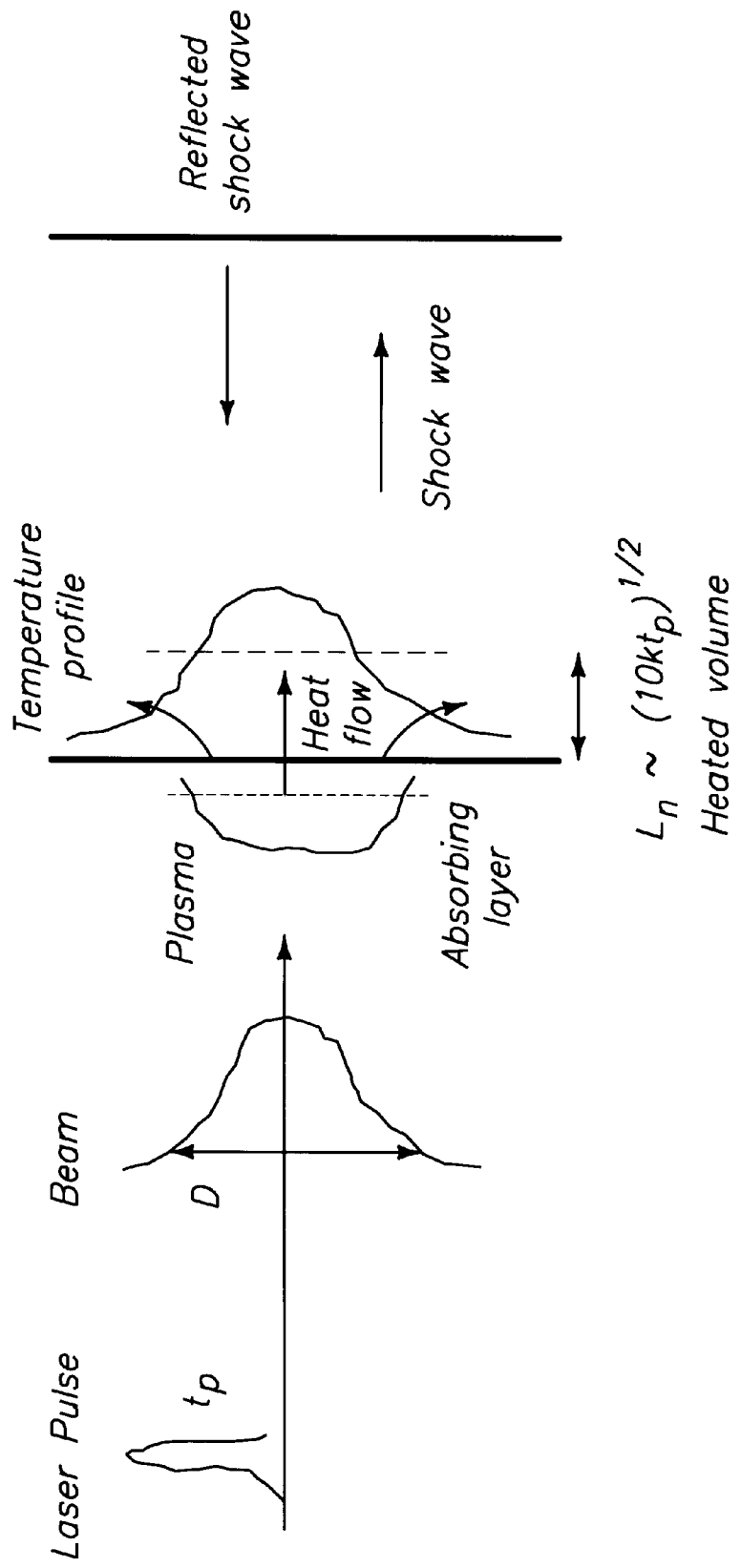
FIG. 4 is a diagram of physical processes relevant to laser hole drilling.

In one embodiment, the pulse energy, duration and spacing are selected for any given material to minimize the laser energy needed to remove material. The physical processes relevant to laser hole drilling are illustrated in FIG. 4. The total laser energy required can be assigned to several process steps, each using some laser energy. The process steps include: (1) forming a surface layer to aid laser absorption; generally the layer is a plasma layer, but the invention can accommodate any transformation of the surface to a highly absorptive state (the absorption coefficient of the surface denoted hereinafter as β); (2) heating the material to its melting temperature or its vaporization temperature; (3) actually melting and/or vaporizing the material; and (4) clearing melted or vaporized material from the hole.

If $I_{opt}$ is the optimal intensity for forming a high absorptive surface layer and $W_{cr}$ is the minimum possible laser pulse energy per volume of material removed, the equations set forth below establish that the material removal efficiency has strong functional dependence on the laser pulse duration, and enable calculation of an optimum pulse duration that minimizes the required energy. The optimum exists because the laser intensity must be just right to produce plasma that couples heat into the material faster than it can diffuse away.

Plasma formation at the material's surface is desirable because the right plasma parameters (density, temperature, thickness) can provide nearly unity absorption and better coupling into the material than the material alone can provide. Insufficient laser intensity produces either no plasma or tenuous plasma that undiscernibly aids laser absorption. Too high a laser intensity produces a high density and, consequently, high reflectivity plasma that is detrimental because it shields the material from effective laser energy absorption and uses up laser energy in sustaining itself Without loss of generality, the optimal intensity, $I_{opt}$, is defined as the intensity for which beam energy transfer into the material is highest. This intensity may be experimentally determined or derived from the details of plasma physics.

Heat penetration into the material can be described using the well-known diffusion equation. Relevant for this analysis is that this equation's solutions are relationships of the form $t_D \propto x^2/\kappa$. That is, the diffusion time, $t_D$, is proportional to the square of the distance diffused, x, and inversely proportional to the diffusivity $\kappa \equiv K/C\rho$, where K is the thermal conductivity of the material, C its heat capacity, and $\rho$ its density. With regard to transverse diffusion, the pulse duration only needs to be much shorter than the time for heat to diffuse out of the beam footprint diameter D. That is, $$t_p \ll t_D \approx D^2/\sigma\kappa. \tag{1}$$

In this equation the value of the numerical constant $\sigma$ depends on the heat flow details, boundary conditions, and geometric factors such as the shape of the laser spot. Typically, the value of $\sigma$ is on the order of 10 for a substantially circular laser spot.

To estimate the depth to which heat diffuses into the material during the pulse (L), it is reasonable to use the equation $$t_p \propto t_D \propto L^2/\sigma\kappa. \tag{2}$$

Solving for L gives $$L \propto (\sigma\kappa t_p)^{1/2}. \tag{3}$$

This depth is used to estimate the volume of material accessible to a single laser pulse.

Because the laser pulse intensity is selected to be at the plasma-coupling optimum, the fluence delivered per pulse is, by definition, $\beta I_{opt} t_p$, and the energy deposited per volume is $\beta I_{opt} t_p/L$, which becomes $\beta I_{opt} t_p^{1/2}/(\sigma\kappa)^{1/2}$ if L is eliminated using the heat diffusion equation.

To further optimize pulse duration, this energy should substantially equal the critical energy per volume $W_{cr}$ defined above as the minimum required to remove the material. Thus, setting these two energy densities to be equal, $W_{cr} = \beta I_{opt} t_p^{1/2}/(\sigma\kappa)^{1/2}$, allows a simple expression to be obtained for the optimal pulse duration, $$t_p \propto \sigma\kappa(W_{cr}/\beta I_{opt})^2 \tag{4}$$

in terms only of the material and laser properties that are desired.

Precise values for $W_{cr}$ and $I_{opt}$ are difficult to determine theoretically. $W_{cr}$ can readily be estimated from known materials parameters, but both $W_{cr}$ and $I_{opt}$ are best determined experimentally. Even rough calculations based on estimates of the parameters (for steel), namely $W_{cr} \sim 15$ kJ/cm$^3$, $I_{opt} \sim 30$ MW/cm$^2$, however, indicate that pulse durations in the microsecond regime are appropriate.

Experiments conducted with metals using a Nd:YAG laser showed that $I_{opt}$ was in the range of 10–100 MW/cm$^2$. $W_{cr}$ can vary for different materials, but it is reasonable to assume it can be estimated as the energy required to heat the material, melt it, and vaporize enough of it so that the addressed volume of material is separated from the rest. Pressure rises inside the heated portion of the material, and the reflection of the shock wave from the back surface likely helps eject the heated material. For example, aluminum requires ~39 kJ/cm$^3$ and steel ~63 kJ/cm$^3$ to be heated and completely vaporized. Taking these values as a $W_{cr}$, and assuming the same $I_{opt} \sim 60$ MW/cm$^2$ for both, an estimate for optimal pulse duration of ~3.5 μs for aluminum ($\kappa$=0.87 cm$^2$/sec) and ~1.5 μs for steel ($\kappa$=0.13 cm$^2$/sec) is obtained. Of course, the real value of optimal pulse duration might be different because it strongly depends on real values $W_{cr}$ and $I_{opt}$, which are best determined empirically. For example, the material need not be completely vaporized because it is ejected by the impulse, and $\kappa$ is different for the solid and the melt.

Optimization of the pulse repetition rate requires consideration of the clearing time for removed material, thermal equilibration of the workpiece, and the timing of shock waves through the material. The clearing process also depends on the diameter of the hole and its depth (or thickness of material) because the plume (cloud) of splinters or droplets of the removed material can freeze again on the walls and the entrance surface forming a recast layer. The required clearing time can be estimated if the speed V of flying away (removed) material (which may be in the form of solid particles, liquid droplets or vapor) is known. Assuming that just some small portion of required critical energy $W_{cr}$, let us say ~1 kJ/cm$^3$, is deposited in the form of kinetic energy ½$\rho v^2$, we can estimate the speed in the order of V~1 km/sec=1 mm/μsec for solid particles, for example, made of aluminum. This estimate shows that time delay (or period) between pulses in the order of tens of microseconds is appropriate for drilling thick materials (tens of millimeters) without a requirement to deposit a substantial portion of laser pulse energy in the form of kinetic energy of removed material.

Figure 5:
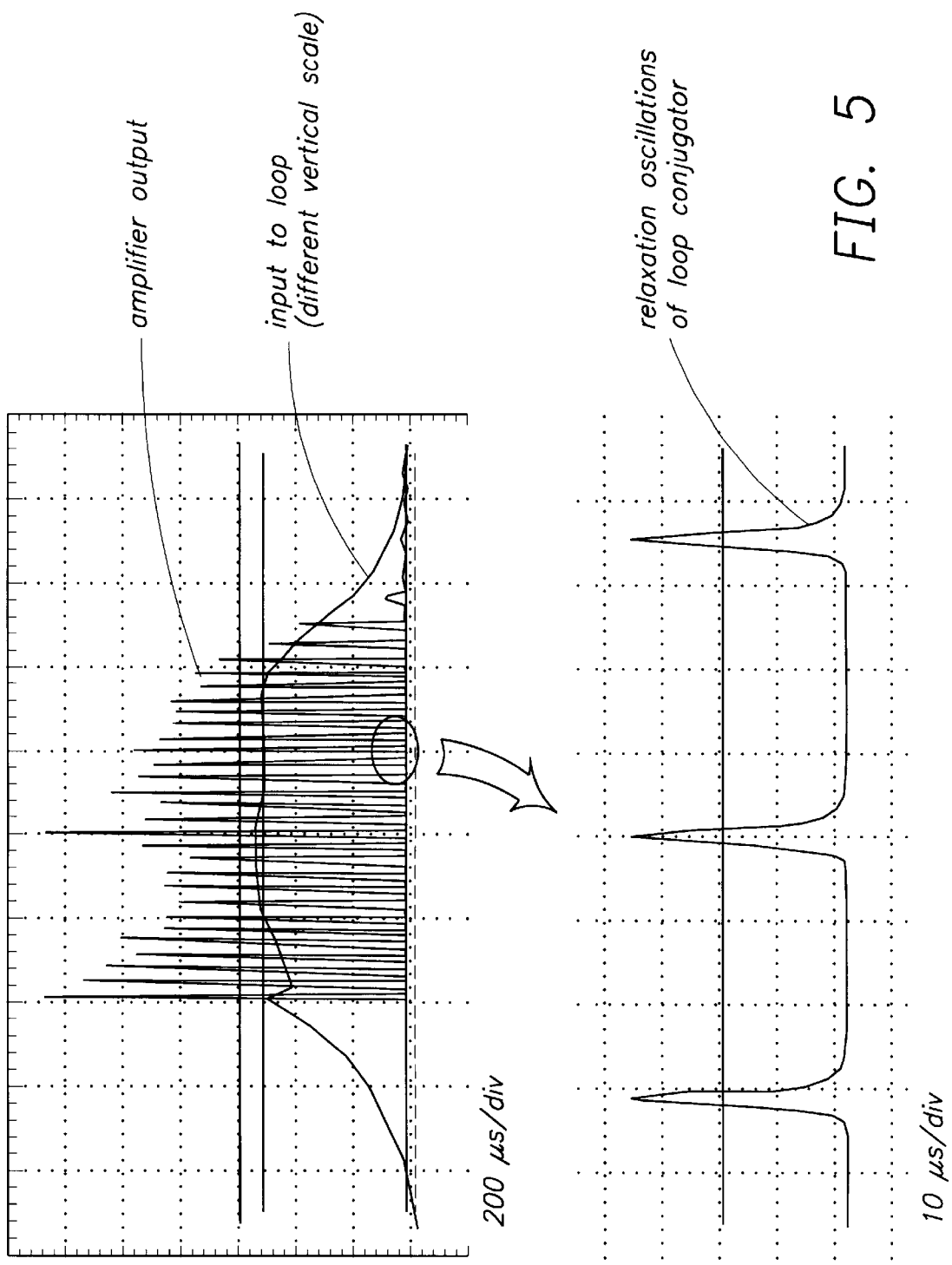
FIG. 5 is a diagram illustrating the pulse shape for an input beam and an output beam from the PC-MOPA-Loop PCM combination of the present invention.
Figure 6:
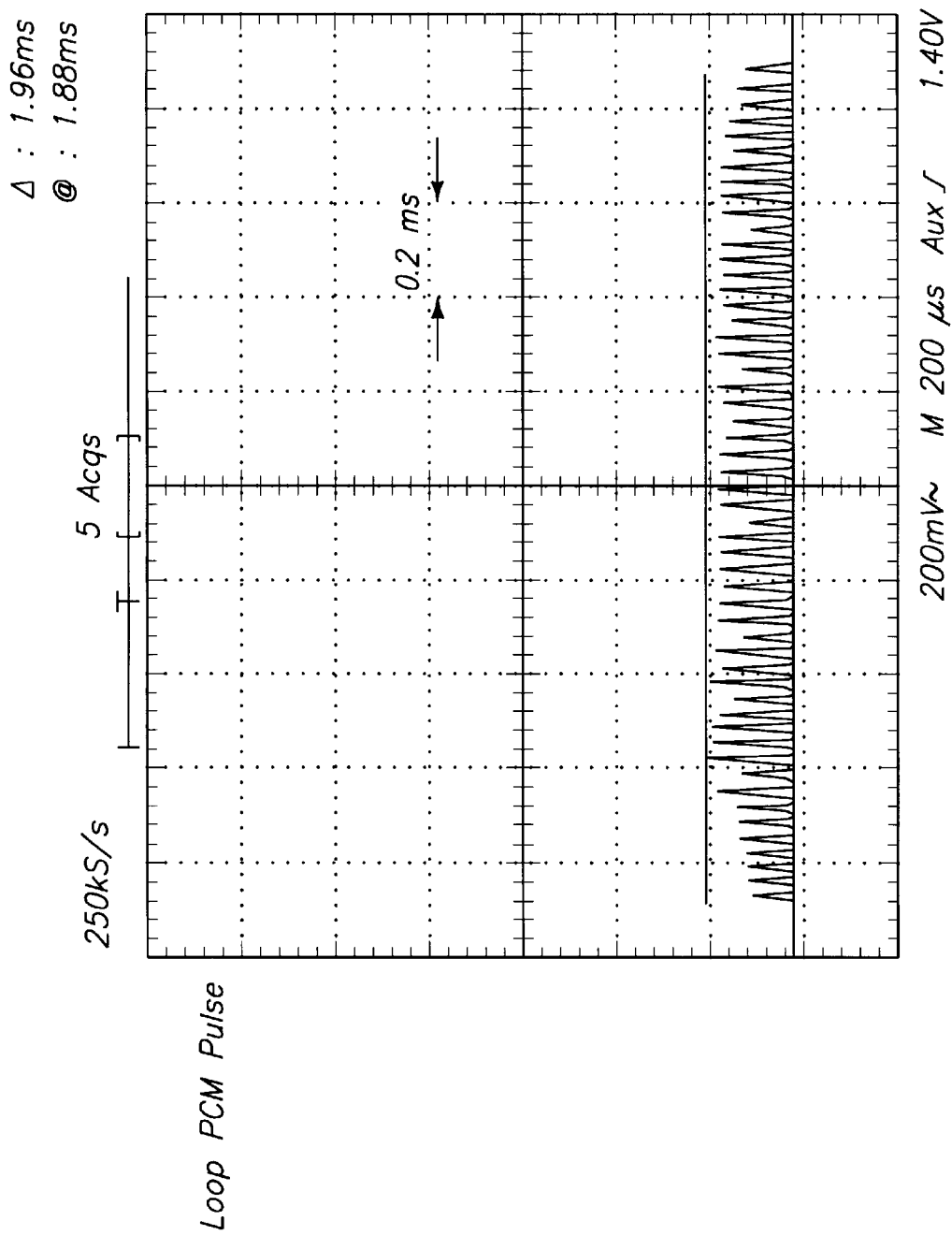
FIG. 6 is a graphical representation of sustained micropulses in the output pulse of the Loop PCM.
Figure 7:
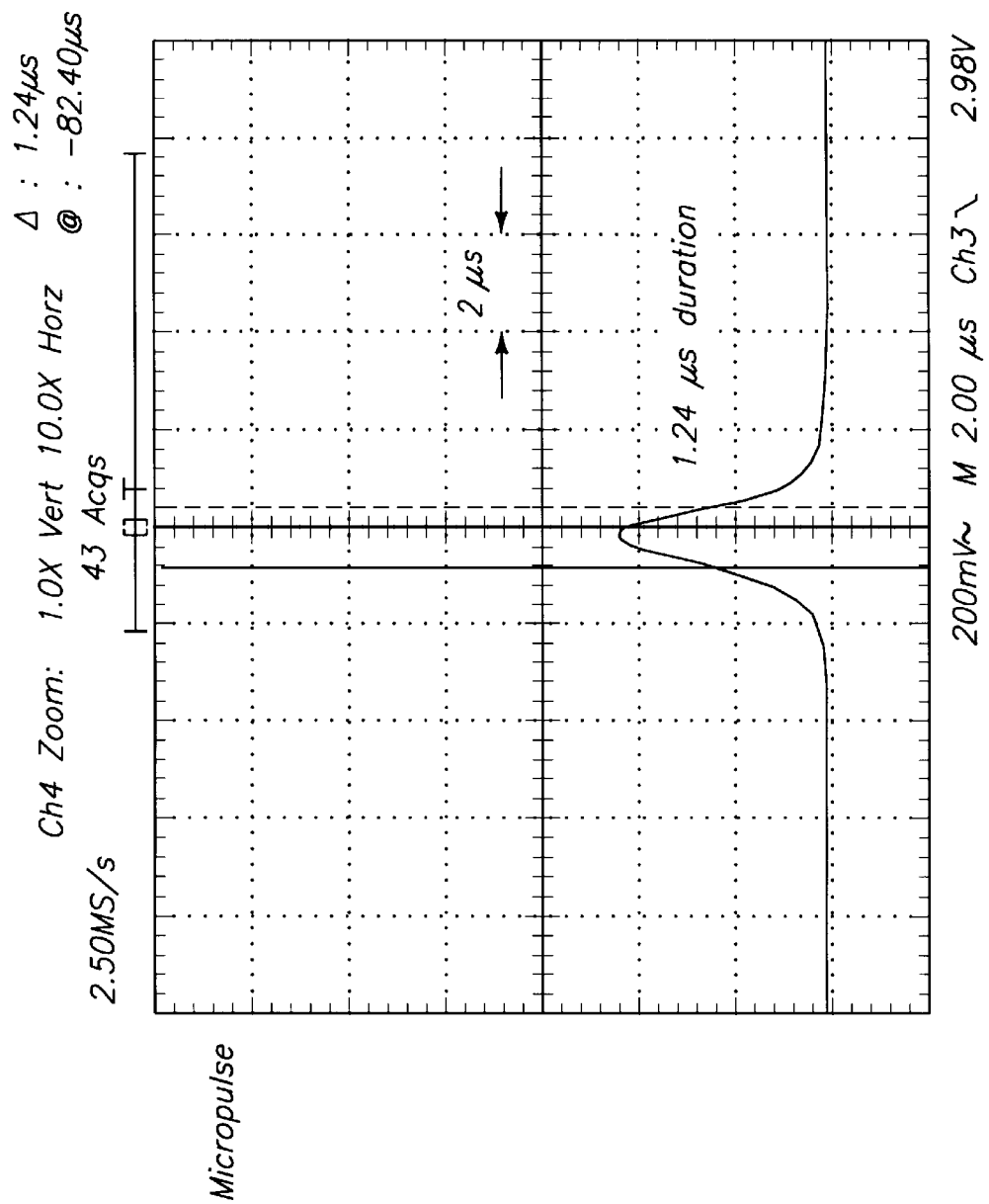
FIG. 7 is a representation of an oscillograph of a single micropulse.

FIGS. 5–7 show examples of the oscillatory output. The output comprises what may be called 'micropulses' or 'pulselets', each approximately 1–2 μs full-width at half-maximum (FWHM) duration, and recurring at intervals from nearly zero (continuous wave) to tens of microseconds, depending on the loop operating conditions. This nomenclature is helpful to distinguish micropulses from the relatively longer duration pump pulse (which has a similar waveform to the input-to-loop pulse shown in FIG. 5) upon which the micropulse structure is superimposed.

Referring to FIGS. 1, and 5–7, self-sustained relaxation oscillations of the Loop PCM likely result because the generated beams $E_2$ 112 and $E_4$ 114 participate in addition to the signal beams $E_1$ 100 and $E_3$ 110 in recording an index grating (a hologram), which increases the reflectivity of the grating (holographic mirror) causing a process similar to self-Q-switching. That is, the output power builds up, forming a pulse, and the gain in the amplifier is depleted. This causes the output to then go to zero, ending the pulse. As the gain builds up again due to continuous pumping, the process is repeated over and over again, producing sustained, continuous pulsations. The period between micropulses decreases with increased amplifier gain and, at a particular gain, they merge forming a continuous output for as long as the laser is pumped. With the present invention, it has been demonstrated that pulsations can be controlled and sustained even for long pump pulses (>1 ms) and that, if the pulse duration and spacing are carefully chosen, these pulses are very desirable for materials processing applications.

Experimental results confirm that the process of drilling strongly depends on the waveform of the laser pulse. The results show that optimal pulse energies and durations, as predicted by the above analysis, do indeed exist. A diffraction quality Nd:YAG laser beam was focused onto a metal sample (steel, stainless steel, aluminum, copper, and others) with a spot size of 0.1 mm diameter.

Figure 8:
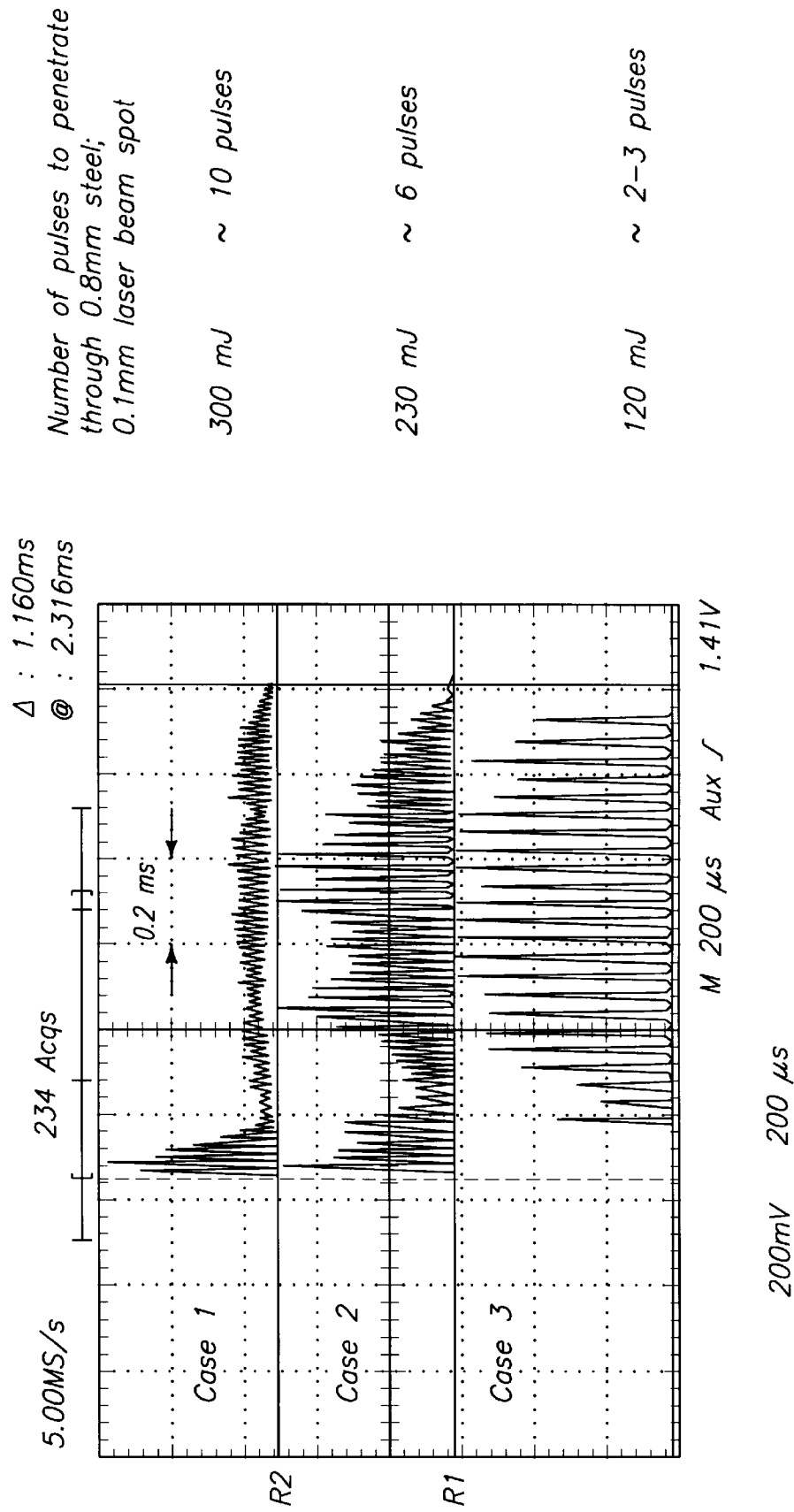
FIG. 8 illustrates three different case scenarios of drilling using different laser pulses.

FIG. 8 presents a summary of a series of experiments in which a PC-MOPA with Loop PCM Nd:YAG laser produced a burst of micropulses, ~1 $\mu$sec duration, under a variable envelope from 0.5 to 5 msec. The spacing between micropulses are controllable from zero up to 50 $\mu$sec by simply changing the gain of the laser amplifier inside the Loop PCM. FIG. 8 lists the number of pulses, with the specified energy per macropulse, required to penetrate through a 0.8 mm thick steel sample for three different pulse formats.

The best case of the three experimental cases, Case 3, represents a 0.9 msec long burst of 22 micropulses, of 1.25 $\mu$sec duration each, and with 40 $\mu$sec spacing between them. The energy per micropulse was 6 mJ, and the peak power 5 kW, which for a 0.1 mm laser spot size, makes the laser intensity 60 MW/cm$^2$. Total energy for drilling was 0.3 J (3 bursts), which, for the given thickness of the sample and laser beam diameter, gives an estimate for critical energy of approximately 60 kJ/cm$^3$. (Note that this estimate of 60 kJ/cm$^2$ may be on the high side since with a 100 $\mu$m diameter laser spot size, radial diffusion of heat is an important energy loss factor [$(t_p \sigma \kappa)^{1/2}$>100 $\mu$m].) Even a small decrease in the burst pulse energy resulted in a substantial increase in the number of pulses needed to penetrate the material. For instance, at 100 mJ (in contrast to 300 mJ), the required number of pulses is more than 30, indicating the value of reaching high enough intensity and providing good coupling. The results demonstrate that the variable pulse of the present invention is much more efficient than those produced by conventional lasers.

To investigate the consequences of using pulses at excessively high intensities, a Q-switched Nd:YAG laser was used to generate 30 nsec pulses at 10 Hz and the energy was varied from 5 to 50 mJ, to drill the same 0.8 mm thick steel sample. It was observed that, even after a continuous running time of 30 minutes, that is, a total of 18,000 pulses, the drilling was not accomplished. The intensity was too high, and the plasma reflected virtually all of the laser light.

Comparing Case 3 of FIG. 8 with the case illustrated in FIG. 2 of the conventional Nd:YAG laser having a pulse of ~1 msec duration (discussed above), typical transient relaxation oscillation occurred during the first ~0.1 msec of the pulse and it required about 1,300 pulses at 300 mJ energy per pulse to penetrate the same 0.8 mm thick steel sample which was used for Case 3. Comparing the results, shows that the conventional laser and method require about 1,300 times more total energy to achieve the result that is achieved with the optimal pulse format of the present invention as illustrated in Case 3.

Comparative tests have also demonstrated that the drilling efficiency of Q-switched pulses with tens-of-nanosecond duration in, for example, steel or aluminum is very poor relative to the drilling efficiency of the present invention with its optimal microsecond pulse duration.

Holes drilled by the present process can be smaller and deeper than those achieved with conventional approaches as demonstrated by the drilling of a 0.004" hole 0.25" deep in aluminum with 4 "shots" (i.e. bursts). Further, the foregoing can be applied to drilling of dielectric materials. Laser drilling is a clean process, and, because it is possible in many cases to drill a hole with the present invention in a single millisecond-duration pulse burst, the present invention allows for substantially increased production rates.

Figure 9:
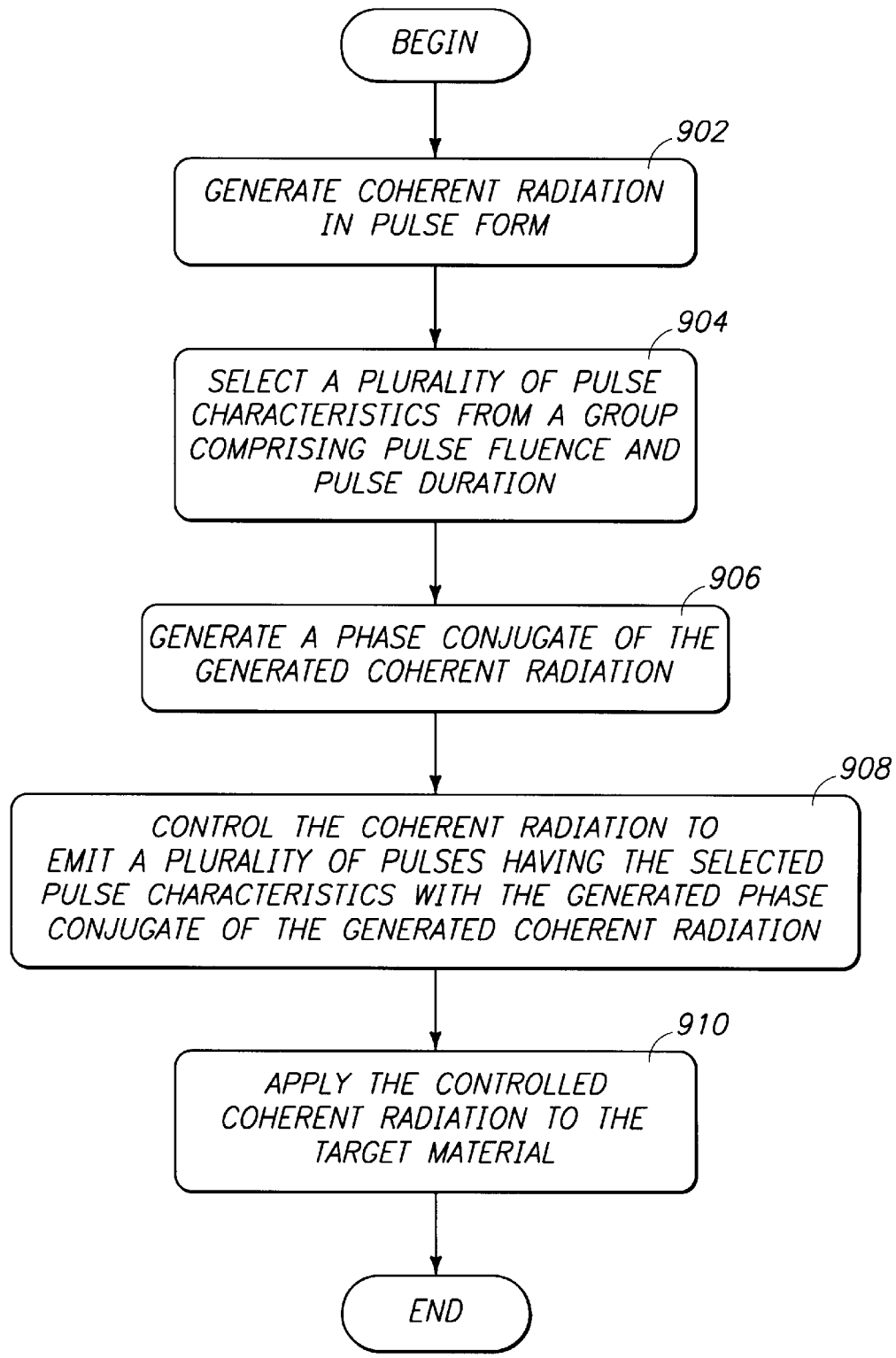
FIG. 9 is a flow chart illustrating exemplary process steps used to practice one embodiment of the present invention.

FIG. 9 is a flow chart illustrating exemplary process steps used to practice one embodiment of the present invention. Coherent radiation is generated in pulse form, as shown in block 902. A plurality of pulse characteristics are selected 904 from a group comprising pulse fluence and pulse duration. Then, a phase conjugate of the generated coherent radiation is generated, as shown in block 906. The coherent radiation is then controlled using the generated phase conjugate of the generated coherent radiation to emit a plurality of pulses having the selected pulse characteristics, as shown in block 908. Then, the controlled coherent radiation is applied to the target material, as shown in block 908

Figure 10:
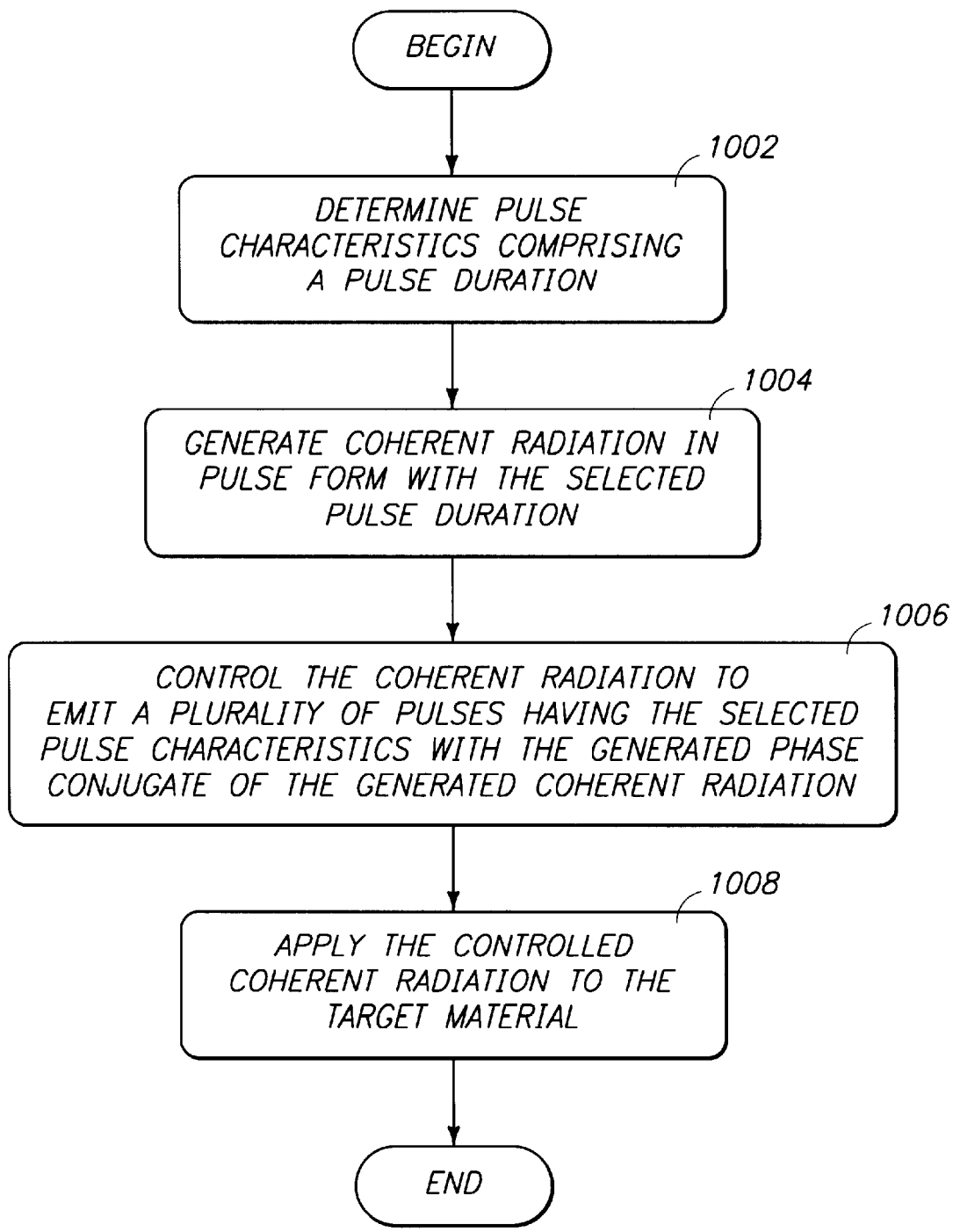
FIG. 10 is a flow chart illustrating exemplary process steps used to practice a second embodiment of the present invention.

FIG. 10 is a flow chart illustrating exemplary process steps used to practice another embodiment of the present invention. Pulse characteristics, including a pulse duration are determined 1002, and coherent radiation is generated 1004 in pulse form with the selected duration. Using the generated phase conjugate of the generated coherent radiation, the coherent radiation is controlled 1006 to emit a plurality of pulses having the selected pulse characteristics. The controlled coherent radiation is then applied to the target material, as shown in block 1008.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. For example, although the foregoing has been described with respect to an oscillator for generating coherent radiation and loop phase conjugator for controlling transient relaxation oscillations to form sustained pulses from the coherent radiation, the present invention could be implemented with a diode or similar laser which is activated and deactivated to achieve the pulse widths described herein. The resulting beam can thereafter be amplified to a suitable value.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for generating radiation, comprising:
    an oscillator for generating coherent radiation; and
    a loop phase conjugator for controlling transient relaxation oscillations in the coherent radiation to form sustained pulses.

2. The apparatus of claim 1, wherein the phase conjugator further comprises an optical diode for biasing a direction of the oscillations.

3. The apparatus of claim 1, wherein the master oscillator operates at laser frequencies.

4. The apparatus of claim 1, wherein the loop phase conjugator comprises:
an optically nonlinear medium; and
relay optics for directing the radiation bidirectionally through the non-linear medium.

5. The apparatus of claim 4, wherein the loop phase conjugator further comprises an optical gain medium.

6. The apparatus of claim 1, further comprising at least one amplifier for amplifying the coherent radiation.

7. A method of applying radiation to a material, comprising the steps of:
generating coherent radiation in pulse form;
selecting a plurality of pulse characteristics from a group comprising pulse fluence and pulse duration;
generating a phase conjugate of the generated coherent radiation;
controlling the coherent radiation to emit a plurality of pulses having the selected pulse characteristics with the generated phase conjugate of the generated coherent radiation; and
applying the controlled coherent radiation to the material.

8. The method of claim 7, wherein the plurality of pulse characteristics are selected to form a surface layer on the material sufficient to aid in laser absorption and to heat the material to a temperature selected from the group comprising a material melting temperature and a material vaporization temperature.

9. The method of claim 7, wherein the material comprises steel, and the pulse energy is approximately 6 mJoules.

10. The method of claim 7, wherein the pulse duration is from approximately one to approximately 5 microseconds.

11. The method of claim 7, wherein the pulse duration is from approximately 10 to approximately 100 microseconds.

12. The method of claim 7, wherein the application of radiation results in drilling a hole in the target material.

13. The method of claim 7, wherein:
the pulse characteristics are selected such that the fluence delivered per pulse is $I_{opt}t_p$, wherein:
$I_{opt}$ is the intensity for which beam energy transfer into the material is highest;
$t_p$ is the pulse duration, which is set to be approximately $\sigma\kappa(W_{cr}/I_{opt})^2$, wherein diffusivity $\kappa \equiv K/C\rho$, where K is the thermal conductivity of the material, C is the heat capacity of the material, $\rho$ is the density of the material, and $\sigma$ is a numerical constant and $W_{cr}$ is the minimum possible laser pulse energy per volume of material removed; and
the pulse spacing is selected such that the amount of pulse energy of the laser that is incident on the material during the clearing time for removed material is minimized.

14. A method of applying radiation to a target material, comprising the steps of:
determining pulse characteristics comprising a pulse duration proportional to $\sigma\kappa(W_{cr}/\beta I_{opt})^2$ wherein $\sigma$ is a numerical constant, $\kappa$ is a diffusivity of the target material, $W_{cr}$ is a minimum possible laser pulse energy per volume of target material removed, $\beta$ is an absorption coefficient of a surface of the target material, and $I_{opt}$ is an optimal intensity for forming an absorptive surface layer;
generating coherent radiation in pulse form with the selected pulse duration;
generating a phase conjugate of the generated coherent radiation;
controlling the coherent radiation to emit a plurality of pulses having the selected pulse characteristics with the generated phase conjugate of the generated coherent radiation; and
applying the controlled coherent radiation to the target material.

15. The method of claim 14, wherein the pulse characteristics further comprise the pulse spacing, and the pulse characteristics are selected to form a surface layer on the target sufficient to aid in laser absorption and to heat the target to temperature selected from the group comprising a material melting temperature and a material vaporization temperature.

16. An apparatus for applying radiation to a target material, comprising:
means for determining pulse characteristics comprising a pulse duration proportional to $\sigma\kappa(W_{cr}/\beta I_{opt})^2$, wherein $\sigma$ is a numerical constant, $\kappa$ is a diffusivity of the target material, $W_{cr}$ is a minimum possible laser pulse energy per volume of target material removed, $\beta$ is an absorption coefficient of a surface of the target material, and $I_{opt}$ is an optimal intensity for forming an absorptive surface layer;
means for generating coherent radiation in pulse form with the selected pulse duration and;
means for generating a phase conjugate of the generated coherent radiation;
means for controlling the coherent radiation to emit a plurality of pulses having the selected pulse characteristics with the generated phase conjugate of the generated coherent radiation; and
applying the controlled coherent radiation to the target material.

17. The apparatus of claim 16, wherein the pulse characteristics further comprise the pulse spacing, and the pulse characteristics are selected to form a surface layer on the target sufficient to aid in laser absorption and to heat the target to temperature selected from the group comprising a material melting temperature and a material vaporization temperature.

* * * * *